United States Patent [19]
Butensky et al.

[11] Patent Number: 5,469,503
[45] Date of Patent: Nov. 21, 1995

[54] METHOD FOR RESYNCHRONIZING SECONDARY DATABASE AND PRIMARY DATABASE WITH PRESERVATION OF FUNCTIONALITY OF AN AUTOMATIC CALL DISTRIBUTION SYSTEM

[75] Inventors: Michael J. Butensky, Milpitas, Calif.; Richard A. Gibbs, Austin, Tex.; Kevin T. Collins, Fremont, Calif.; Yih-Nan Yang, Cupertino, Calif.; Eric M. Johnson, Los Altos, Calif.; Chris A. Grafft, Austin, Tex.

[73] Assignee: Aspect Telecommunications Corporation, San Jose, Calif.

[21] Appl. No.: 138,547

[22] Filed: Oct. 14, 1993

Related U.S. Application Data

[63] Continuation of Ser. No. 97,632, Jul. 27, 1993, abandoned.
[51] Int. Cl.⁶ .......................... H04M 3/00; G05B 15/00; G05B 9/02; G06F 11/00
[52] U.S. Cl. .................. 379/265; 364/132; 364/187; 379/279; 379/309; 395/600; 395/650; 395/200.19; 395/182.1
[58] Field of Search ...................... 379/265, 266, 379/268, 269, 279, 309; 364/132, 187, 222.2, 222.3, 228.3, 230.4; 371/9.1; 395/200

[56] References Cited

U.S. PATENT DOCUMENTS

| | | | |
|---|---|---|---|
| 4,466,098 | 8/1984 | Southard | 379/279 X |
| 4,633,039 | 12/1986 | Holden | 379/279 X |
| 4,700,292 | 10/1987 | Campanini | 395/200 |
| 5,214,692 | 5/1993 | Chack et al. | 379/265 |

*Primary Examiner*—Jeffery A. Hofsass
*Assistant Examiner*—Harry S. Hong
*Attorney, Agent, or Firm*—Townsend and Townsend and Crew; Kenneth R. Allen; William L. Shaffer

[57] ABSTRACT

In an automatic call distribution (ACD) system having a controller function, a primary system controller and a redundant system controller wherein the secondary system controller is in active operation and the primary system controller is out of synchronization with the redundant system controller, a method is provided for resynchronizing the primary system controller to the redundant system controller wherein selected database update functionality of the redundant system controller is suspended and database files and shared memory are copied in phases from the redundant system controller to the primary system controller with the means provided to continue to do data collection, call answering and queuing of calls, except for a brief period immediately preceding resynchronization. A slight delay added by the system in the process of answering incoming calls provides sufficient time for the primary system controller to resynchronize to the redundant system controller with all information and data, at which time the primary system controller assumes real-time operation and the redundant system controller returns to synchronous standby mode.

5 Claims, 2 Drawing Sheets

METHOD FOR RESYNCHRONIZING SECONDARY DATABASE AND PRIMARY DATABASE WITH PRESERVATION OF FUNCTIONALITY OF AN AUTOMATIC CALL DISTRIBUTION SYSTEM

CROSS REFERENCE TO RELATED APPLICATION

This is a continuation of U.S. Ser. No. 08/097,632, filed Jul. 27, 1993, now abandoned.

BACKGROUND OF THE INVENTION

This invention relates to telephone call routing systems known as automatic call distributors (ACDs) and more particularly to elements of such systems for optimally routing incoming calls based on caller needs. Automatic call distributors provide automatic routing of incoming telephone calls in conjunction with a private switchboard or Private Branch Exchange (PBX) equipment through caller responses to prompts. An ACD is frequently used by relatively large companies to screen calls as part of telephone-based support for services to remote users or for routing queries regarding products or services for sale.

A significant requirement of an ACD system is a need for continuous and substantially real-time system operation and availability of access to data. In an ACD system of interest, to minimize the adverse impact of failure of key hardware, the system configuration includes extensive redundancy.

Referring to FIG. 1 in a simplified representation of an ACD 10, among the subsystems are a primary system controller 12 with a central processor 14, random access memory 116, associated software 26 such as operating system software and database management systems, mass storage complex 18 and I/O ports 20, 21, 22 coupled to a subsystem bus 24. Among the redundant subsystems are a redundant system controller 112 with a central processor 114, random access memory 16, duplicate associated software 126, mass storage complex 118 and I/O ports 120, 121, 122 coupled to a bus 124. I/O ports 20 and 120 are coupled together via dedicated data transfer path 40, which may be an ethernet link. A first switching means 34 and a second switching means 35 under control of CPU 114 via control line 29 control the routing of transactions to and from agent telesets 36, 37, caller trunks 38, 39 and process I/O ports with internal buffers 22, 122 on one hand and transactions to and from management terminals 41, 42 and process I/O ports 21, 121.

Associated with the CPU 114 is an element which is operative primarily in connection with the redundant system controller 112. It is a module which is herein called a controlling means 126 that monitors the operation of the redundant system controller 112. A duplicate controlling means 26 is associated with the CPU 14. Together with data transfer path 40 their operation assures that each control system 12, 112 operates synchronously, state by state. The redundant system controller 112 is normally in hot synchronous standby operation until a fault is sensed by failure to receive "still alive" signals via data transfer path 40. Specifically, the redundant system controller 112 follows and imitates operation of the primary system controller state for state so that in the event of failure in the primary controller 12, the redundant system controller 112 simply resumes functioning by causing a switchover of the management terminals 41, 42, the agent telesets 36, 37 and the caller trunks 38, 39 to the redundant system controller 112 through controlling the switches 35, 34 on control line 29, so that the redundant system controller 112 takes over, transparently and without perceptive disruption of service, all functions of the primary system controller 12, including call handling and data collection, until the failure can be corrected.

However, in the course of operation of the redundant system controller 112, since the data collection continues only in the redundant system, the primary system controller 12 loses synchronization.

In the past, the primary system controller 12 could be resynchronized only by suspending operations of the ACD system and shutting down the entire ACD system, and then transferring a copy of the then-stable stored information to the then-repaired and functional primary control system and reinitiating the system. Shutting down a real-time system such as an ACD system 10 is an extremely inconvenient and disruptive process which in the past generally required that the system be shut down and restored only during the least active time of the day or week (e.g., Monday mornings at 3 am). Restoration typically requires many tens of minutes, as large amounts of data must be transferred. In the meantime, and prior to restoration, reliable operation of the ACD system remained at risk due to the potential for failure of the secondary control system 112.

In order to solve this problem, what is needed is a reliable mechanism for resynchronizing the primary system controller 12 to the redundant system controller 112 in an ACD system without interrupting real-time operation and so that the primary system controller can transparently resume operational control and the redundant system controller can return to synchronous standby operation.

SUMMARY OF THE INVENTION

According to the invention, in an automatic call distribution (ACD) system having a primary system controller and a redundant system controller wherein the secondary system controller is in active operation and the primary system controller is out of synchronization with the redundant system controller, a method is provided for phased updating and resynchronizing the primary system controller to the redundant system controller wherein a control element of the secondary system controller suspends selected database update functionality of the redundant system controller and copies database update files and call detail files from the redundant system controller to the primary system controller while a buffer continues data collection, and queuing of calls. Shared memory functions are copied with the memory update functions locked before control is transferred. A slight delay added by the system in the process of answering incoming calls provides sufficient time for the primary system controller to resynchronize to the redundant system controller with all information and data, at which time the primary system controller assumes real-time operation and the redundant system controller returns to synchronous standby mode.

In a specific embodiment, the redundant subsystem processor 114 restricts modification of call control tables and caller (user) entry into a voice subsystem without dropping or otherwise losing queued calls. During the final period of resynchronization, the answering of incoming calls is delayed for up to about thirty seconds to permit the secondary system controller to dump accumulated information to the primary system controller.

The invention will be better understood by reference to the following detailed description in connection with illustrative drawings.

DESCRIPTION OF SPECIFIC EMBODIMENTS

Figure 1:
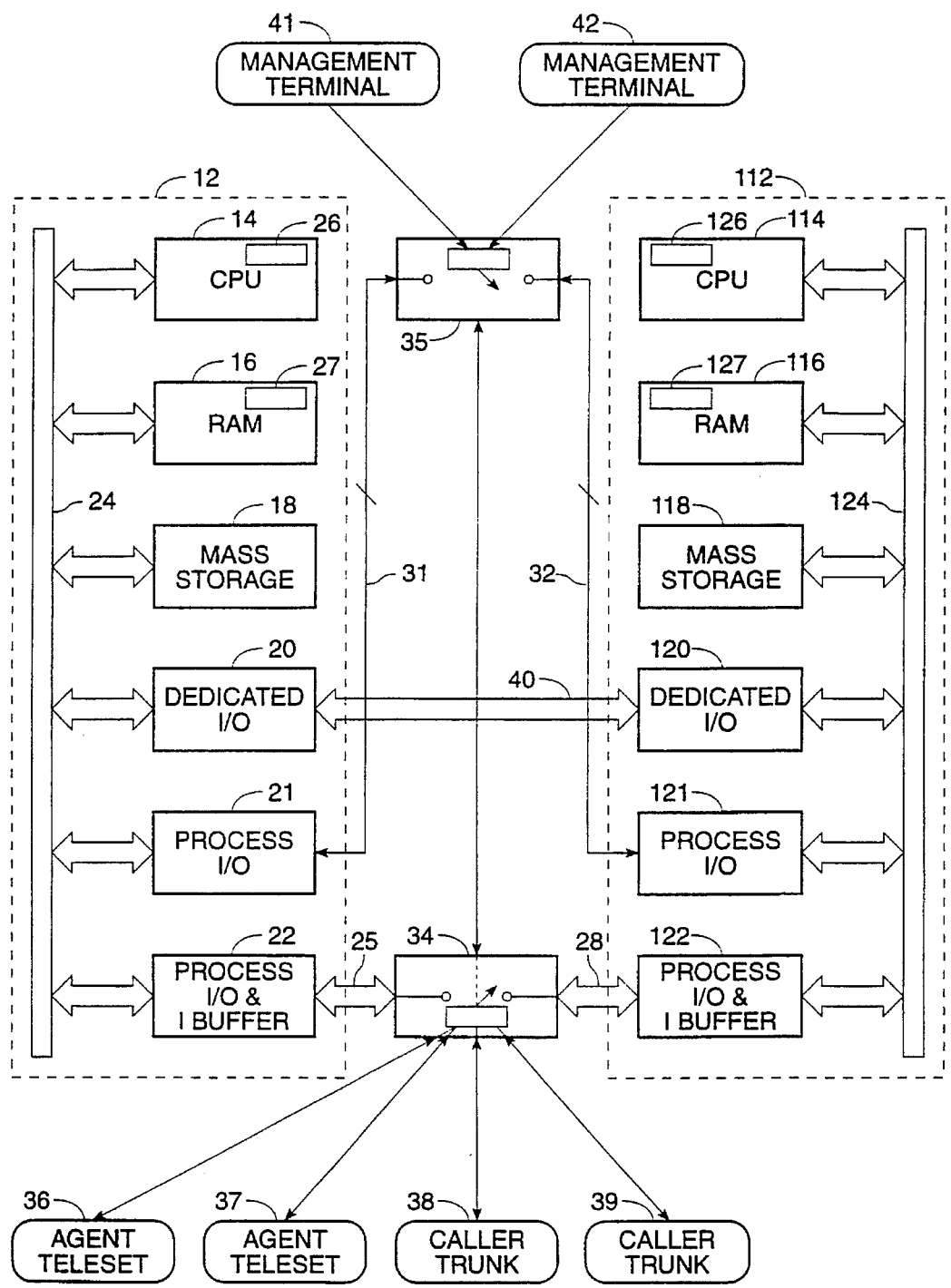
FIG. 1 is a block diagram of a relevant portion of an automatic call distribution system according to the invention.

In FIG. 1, a portion of an automatic call distribution (ACD) system 10 has been illustrated and explained hereinabove. According to the invention, a module 126 associated with the CPU 114 of the secondary system controller 112 includes a functionality to control the phased switchover from operation under the redundant system controller 112 back to the primary system controller 12 after functionality of the primary system controller 12 has been restored. The module 126 effectively controls call switching means 34, 35, which is basically a multiplexer by which processes and calls are routed between the respective systems 12, 112 and waiting service agents 36, 37 and caller trunks 38, 39 through the links 25 and 28 and between manager terminals 41, 41 and respective systems 12, 112. The switchover occurs substantially transparently so that a service agent 36 is not disconnected from an active call in progress, and so that any queued calls in the ACD 10 are not lost or disconnected. Buffering is provided in element 122 by which selected transactions not fully registered during switchover can be processed without being lost. Information transfer from redundant or secondary system controller 112 and primary system controller 12 associated with updating and switchover is carried out by high-speed data transfer path 40.

Figure 2:
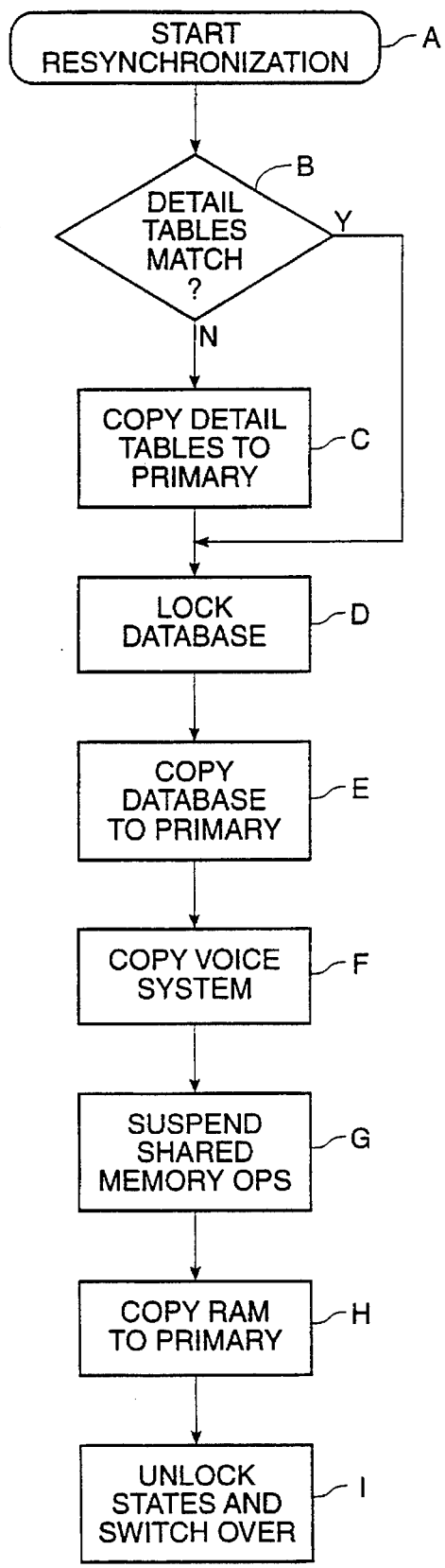
FIG. 2 is a flow diagram of a process for resynchronization according to the invention.

A process according to the invention is illustrated in FIG. 2 in connection with FIG. 1. Resynchronization is initiated after the primary system controller 12 is ready to resume operation (Step A). The controlling means 26 then tests for match or synchronization between detail tables of the primary system controller 12 and the secondary system controller 112 in the mass storage complex 18, 118 (Step B). These include in a specific embodiment a Call Detail Table, a Call Today Table and an Event Detail Table. If the detail tables are synchronized, the next step, copying, is skipped. Otherwise, during a period of up to about ninety minutes, the detail tables are copied to the primary system controller 12 through dedicated data transfer path 40, such as an Ethernet link, to the mass storage complex (Step C). During this phase database backups cannot be initiated and custom reports cannot be modified but otherwise the system operation is essentially unconstrained.

The database is thereupon locked against change (Step D) so that system redundancy restoration can begin. The database files are then copied to the inactive controller, including call control tables and user records (Step E) to resynchronize system configuration. Since the database is locked, procedures which would modify the database fail. The period, which lasts for up to about twenty minutes, is sufficient to allow transfer of substantial amounts of data without disabling basic system operation.

If the ACD is equipped with a voice system, then the next step is to copy the voice system database to the inactive system (Step F). During this period of up to about two minutes, callers are restricted from leaving voice messages, and announcements or new instruction prompts cannot be recorded.

The RAM 16 and 116 contains live information needed for real-time operation. Certain portions of memory 16, 116 is shared, that is, it contains information which is subject to modification as a consequence of call processing. Therefore, shared memory operations are suspended (Step G), and the relevant regions of RAM 116 are copied under control of the controlling means 26 to the inactive RAM 16 (Step H), an operation which lasts no more than about a half a minute. During the RAM copying procedure, no terminal input is accepted and no incoming calls are answered. However, all queued calls in remain queued and all calls in progress remain connected to agents. Thereafter, the locked states of both the primary system controller 12 and the secondary system controller 112 are unlocked and the controlling means 26 causes a switchover in control to the primary system controller 12 (Step I). Resynchronization requires less than one second, after which the primary system controller 12 resumes all full normal functions, and the secondary system controller 112 returns to its synchronous standby mode, tracking the state of the primary system controller 12.

The invention has now been explained with reference to specific embodiments. Other embodiments will be apparent to those of skill in the art. It is therefore not intended that this invention be limited, except as indicated by the appended claims.

What is claimed is:

1. In an automatic call distribution system for distributing client calls to client service agents in real time, said automatic call distribution system including a primary computer means with a primary database means, a secondary computer means with a secondary database means, said secondary computer means for synchronously following states of said primary computer means, and means for controlling and coordinating operation of said primary computer means and said secondary computer means, a method for resynchronizing said primary computer means with said secondary computer means following interruption of usage of said primary computer means, said resynchronization being without interruption of service to said client calls, said method comprising the steps of:

(a) using said controlling means in connection with said secondary computer means to lock said secondary database means against updating of configuration information; thereafter (b) using said controlling means to copy selected database elements of said secondary database means to said primary computer means to replace selected elements of said primary database means; thereafter (c) using said controlling means to copy memory elements from said secondary computer means to said primary computer means; thereafter (d) using said controlling means to transfer operation from said secondary computer means with said secondary database means to said primary computer means with said primary database means;

(e) using said secondary computer means to unlock said secondary database means against updating of configuration information; and (f) resynchronizing said primary computer means and said secondary computer means.

2. The method according to claim 1, wherein said step (a) includes using said controlling means to restrict modification of call control tables and to restrict caller entry into a voice subsystem.

3. The method according to claim 2, wherein said step (c) includes using said controlling means to delay answering of incoming calls for up to about thirty seconds during final resynchronization, to permit said controller means to transfer all accumulated information to said primary computer means.

4. The method set forth in claim 1 further comprising the step of collecting data and queuing incoming calls in a buffer while said secondary database means is locked.

5. The method set forth in claim 4 further comprising the step of updating said primary database and said secondary database with data and calls from said buffer after said primary and secondary computer means are resynchronized.

* * * * *